United States Patent
Rantsevitch

(10) Patent No.: US 7,929,423 B2
(45) Date of Patent: Apr. 19, 2011

(54) MLPPP SEQUENCE NUMBER SYNCHRONIZATION BETWEEN THE ACTIVE AND STANDBY TRANSMITTERS

(75) Inventor: Sasha Rantsevitch, Dunrobin (CA)

(73) Assignee: Alcatel Lucent, Paris (FR)

( * ) Notice: Subject to any disclaimer, the term of this patent is extended or adjusted under 35 U.S.C. 154(b) by 215 days.

(21) Appl. No.: 12/347,642

(22) Filed: Dec. 31, 2008

(65) Prior Publication Data

US 2010/0166020 A1 Jul. 1, 2010

(51) Int. Cl.
*G06F 11/20* (2006.01)
(52) U.S. Cl. .................................. 370/219; 370/509
(58) Field of Classification Search ............... 370/219, 370/464, 474
See application file for complete search history.

(56) References Cited

U.S. PATENT DOCUMENTS

| | | | |
|---|---|---|---|
| 6,594,229 B1 * | 7/2003 | Gregorat | 370/219 |
| 6,608,813 B1 * | 8/2003 | Chiussi et al. | 370/218 |
| 6,853,641 B2 * | 2/2005 | Lindhorst-Ko et al. | 370/394 |
| 6,912,197 B2 * | 6/2005 | Mahamuni | 370/219 |
| 6,952,434 B1 * | 10/2005 | Jagannatharao et al. | 370/536 |
| 7,024,222 B2 * | 4/2006 | Gorsuch | 455/553.1 |
| 7,363,534 B1 * | 4/2008 | Krishnamurthy et al. | 714/13 |
| 7,522,590 B2 * | 4/2009 | Huang et al. | 370/389 |
| 7,801,135 B2 * | 9/2010 | Appanna et al. | 370/390 |
| 2002/0075867 A1 * | 6/2002 | Herrmann | 370/389 |
| 2007/0253446 A1 * | 11/2007 | Wilson et al. | 370/473 |
| 2007/0299973 A1 * | 12/2007 | Borgendale et al. | 709/227 |
| 2008/0010487 A1 * | 1/2008 | Dekel et al. | 714/4 |
| 2008/0069149 A1 * | 3/2008 | Poulin et al. | 370/503 |

* cited by examiner

*Primary Examiner* — Ricky Ngo
*Assistant Examiner* — Ben H Liu
(74) *Attorney, Agent, or Firm* — Kramer & Amado, PC

(57) ABSTRACT

A method and system for MLPPP sequence number synchronization between the active and standby side transmitters is disclosed. The MLPPP sequence number synchronization system includes a method for the standby side to associate transmit frame fragment numbers used by the active side to those generated by the transmitter on the standby side. The association is used to produce an offset which is used to synchronize the active and standby transmitters. The MLPPP sequence number synchronization system is particularly useful for overcoming the drawbacks of high bandwidth signaling between active and standby sides of switches known in the art.

20 Claims, 2 Drawing Sheets

MLPPP SEQUENCE NUMBER SYNCHRONIZATION BETWEEN THE ACTIVE AND STANDBY TRANSMITTERS

FIELD OF THE INVENTION

The invention relates to Multilink Point-to-Point Protocol (MLPPP) and is particularly concerned with maintaining synchronization between an active MLPPP receiver and transmitter side of a switch, and the hot-standby MLPPP receiver and transmitter of the same switch.

BACKGROUND OF THE INVENTION

As described in US patent application publication number 2007/0253446 and incorporated herein by reference; multilink protocols are well known in the art and have been standardized for both point-to-point protocol (MLPPP, also referred to as MP) and Frame Relay protocol (MLFR, also referred to as MFR), among others. Multilink protocols combine multiple physical or logical links and use them together as if they were one high-performance link. MLPPP is described in RFC 1717, which has been updated by RFC 1990. MLFR is described by specifications FRF.15 and FRF.16. (Note: If not otherwise stated herein, it is to be assumed that all patents, patent applications, patent publications and other publications (including web-based publications) mentioned and cited herein are hereby fully incorporated by reference herein as if set forth in their entirety herein.)

MLPPP and the MLFR Protocols function by fragmenting datagrams or frames and sending the fragments over different physical or logical links. Datagrams or frames received from any of the network layer protocols are first encapsulated into a modified version of the regular PPP (Point-to-Point Protocol) or FR (Frame Relay) frame. A decision is then made about how to transmit the datagram or frame over the multiple links. Each fragment is encapsulated and sent over one of the links.

On a receiving end, the fragments received from all of the links are reassembled into the original PPP or FR frame. That frame is then processed like any other PPP or FR frame, by inspecting the Protocol field and passing the frame to the appropriate network layer protocol.

The fragmenting of data in multilink protocols introduces a number of complexities that the protocols must be equipped to handle. For example, since fragments are being sent roughly concurrently, they must be identified by a sequence number to enable reassembly. Control information for identifying the first and last fragments must also be incorporated in the fragment headers. A special frame format is used for the fragments to carry this information.

One possible remedy for this would be to utilize the solution disclosed in U.S. Pat. No. 6,912,197 wherein the active and standby processors exchange messages to synchronize fragment numbers. The active processor sends periodic updates to the standby processor with a sequence number. On an activity switch, the newly active processor calculates a new sequence number as a sum of the number received from the previously active processor plus a jump number. The jump number is calculated as a maximum number of fragments that can be transmitted in a timeframe between the previous update and the switchover time.

There may be at least two drawbacks of this solution. The first is the burden of sending periodic messages between the processors. There may be hundreds and thousands of MLPPP groups supported on the switch processor. Sending periodic messages for all of them may be resource consuming. Another other drawback is that the jump count may vary since the fragment rate is not predictable. It will almost always be greater than the number expected by the receiver. The receiver at the other end of the network may have to unnecessarily wait for missing fragments that will never come in. This creates a delay in the fragment flow since the receiver must wait for "missing" fragments until a timeout expires.

SUMMARY OF THE INVENTION

An object of the present invention is to provide an improved method and system for active and hot-standby receiver/transmitter portions of a switch.

According to an aspect of the present invention there is provided a method for synchronizing the transmit frame fragment sequence numbers of active and standby transmitters on line cards in a switch supporting multilink protocol having active and standby sides. The method has the steps of first, initializing a standby transmit sequence number for the standby transmitter to an initial value; and subsequently incrementing the standby transmit sequence number with each transmit frame fragment handled by the standby transmitter. This is followed by the step of associating the standby transmit sequence number with respective receive sequence numbers received by the switch and determining an association of transmit frame fragment sequence numbers used by the active transmitter for respective receive sequence numbers received by the switch. Then, calculating an offset to the standby transmit sequence number based upon the difference between the standby transmit sequence number associated to a specific receive sequence number and an active transmit frame fragment sequence number associated to the same specific receive sequence number. Finally, applying said offset to the standby transmit sequence number to bring the standby transmit sequence number in synchronization with the transmit sequence numbers of the active side.

Advantageously, the determining step further may further have the step of querying of the active side by the standby side in respect of transmit frame fragment sequence numbers associated to receive frame fragment sequence numbers.

Also advantageously, the query step may specify a specific receive frame fragment sequence number or a plurality of specific receive frame fragment sequence numbers for the active side to provide an association to.

Under some configurations there is the additional step of extrapolating a specific receive frame fragment sequence number based at least in part upon the receive frame fragment sequence numbers received by the standby side. This additional step may also take into account the rate at which receive frame fragments are being received.

Advantageously, the query step may be repeated in the event that no association is received by the standby side from the active side. This repetition may be initiated after a specified quantity of time has elapsed without an association being received.

According to another embodiment of the invention, there is provided a system for synchronizing the transmit frame fragment sequence numbers of active and standby transmitters on line cards in a switch supporting multilink protocol having active and standby sides. The system provides for the initializing a standby transmit sequence number for the standby transmitter to an initial value; and subsequently incrementing the standby transmit sequence number with each transmit frame fragment handled by the standby transmitter. This is followed by associating the standby transmit sequence number with respective receive sequence numbers received by the switch and determining an association of transmit frame fragment sequence numbers used by the active transmitter for respective receive sequence numbers received by the switch. Then, a calculation of an offset to the standby transmit sequence number based upon the difference between said standby transmit sequence number associated to a specific receive sequence number and an active transmit frame fragment sequence number associated to the same specific receive sequence number is performed. Finally, the system applies the offset to the standby transmit sequence number to bring the standby transmit sequence number in synchronization with the transmit sequence numbers of the active side.

BRIEF DESCRIPTION OF THE DRAWINGS

The present invention will be further understood from the following detailed description of embodiments of the invention, with reference to the drawings in which.

DETAILED DESCRIPTION

In order to provide reliable operation, modern communication switches provide replacement of operating devices with redundant devices in order to secure continued operation. These redundant or "standby" devices may be switched into operation manually, or more commonly automatically, in the event of a failure.

For minimum service disruption, standby devices operating in a "hot" standby mode operate to "shadow" the operation of the active device they are intended to replace. In the hot-standby mode data traffic handling, signaling, and other aspects of switching operation are being handled in the hot-standby device as much as possible, short of actually disrupting normal operation.

Switching systems where the active receiver and the standby receiver are capable of receiving the same flow of MLPPP fragments are well known in the art. An example of such a system is Alcatel-Lucent's 7670 RSP switch. Both the active receiver and the standby receiver receive fragment frames with the same fragment sequence numbers. For seamless standby transmitter cutover in the case of active side failure, there must be some form of synchronization of the transmit sequence number such that the standby transmitter commences transmitting frame fragments with the same sequence number as the active transmitter would have should it not have failed.

In many implementations the active and standby frame processors are located on different physical line cards within the switching equipment. This synchronization of transmit frame fragment sequence numbers is complicated by having to effect the synchronization across the interconnection between the physical line cards. Signaling channels and bandwidth associated with the synchronization would preferably be kept to a minimum.

In operation, every transmit fragment frame sequence number that is transmitted from the switch will occur concurrent to a respective receive fragment frame sequence number. The transmit fragment frame sequence number may be associated to the receive fragment frame sequence number in the transmitter.

Figure 1:
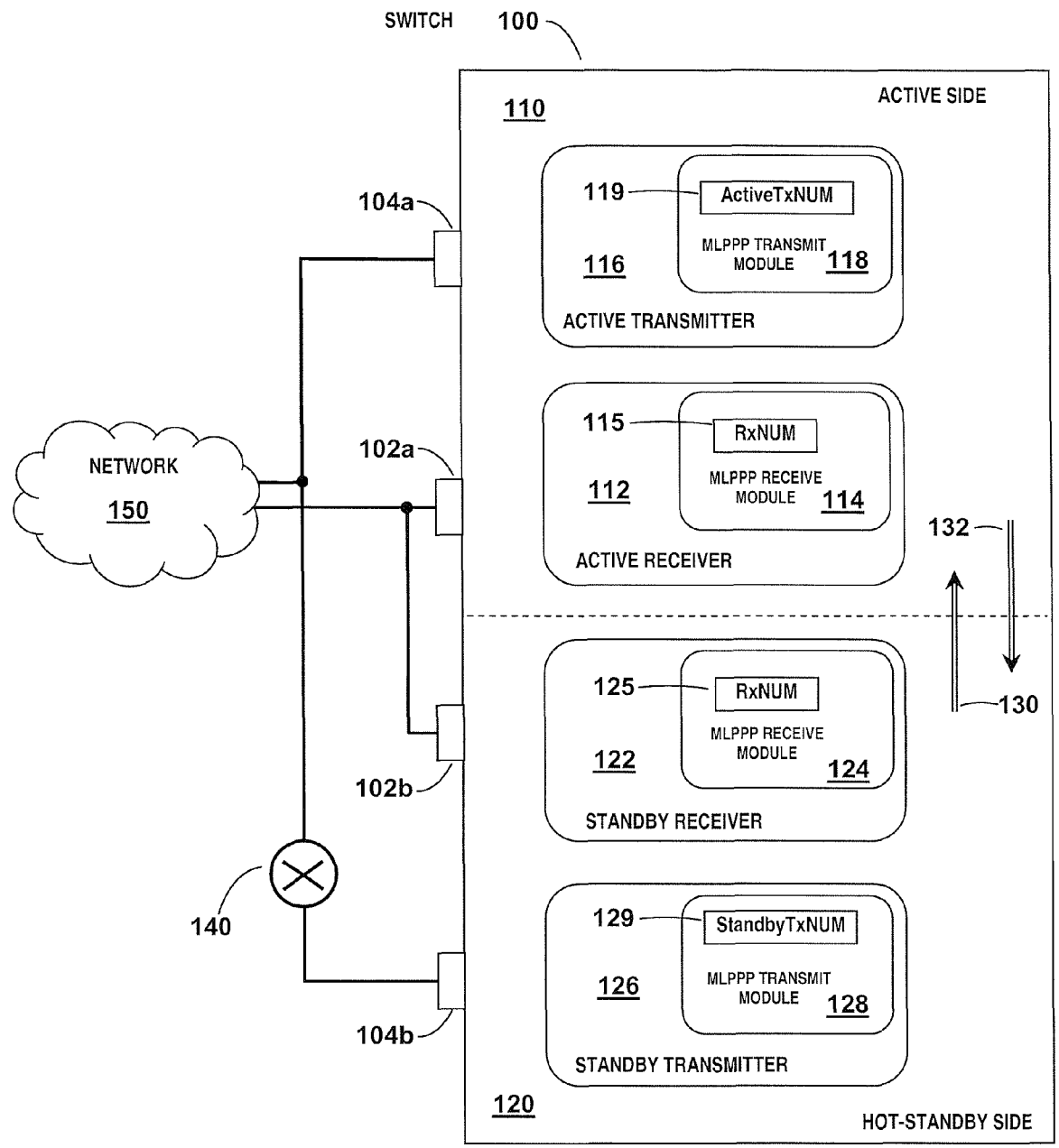
FIG. 1 illustrates an active and hot-standby receiver and transmitter in a switch supporting MLPPP in accordance with an embodiment of the present invention.

Referring to FIG. 1, there may be seen switch 100 having a connection to a data network 150 via input ports 102a and 102b, and via output ports 104a and 104b.

In FIG. 1, active side 110 has an active receiver 112 and an active transmitter 116. Operating within active receiver 112 is MLPPP Receive Module 114 which has a storage element containing a receive frame fragment sequence number RxNUM 115. Operating within active transmitter 116 is MLPPP Transmit Module 118 which has a storage element containing a transmit frame fragment sequence number ActiveTxNum 119.

Likewise, hot-standby side 120 has a standby receiver 122 and a standby transmitter 126. Operating within standby receiver 122 is MLPPP Receive Module 124 which has a storage element containing a receive frame fragment sequence number RxNUM 125. Operating within standby transmitter 126 is MLPPP Transmit Module 128 which has a storage element containing a transmit frame fragment sequence number StandbyTxNum 129.

The ports 102a, 102b, 104a, and 104b are representative of connections to data network 150 and may be separate physical elements. These ports are associated for redundancy purposes by configuration management. Disconnect 140 inhibits standby transmitter 126 message frame fragments from output port 104b from reaching network 150. In the event of a failure in which the hot-standby side 120 replaces the active side 110 in operation, disconnect 140 would operate to connect output port 104b to network 150, thereby allowing the hot-standby side 120 to become the active side.

In operation, the standby transmitter learns a transmit frame fragment's sequence number used by the active transmitter after the active transmitter associates a transmit frame fragment with a specific receive frame fragment. Upon startup the standby side has an initial transmit frame fragment sequence number. As it operates in parallel to the active side it will assign incremental transmit frame fragment sequence numbers to outgoing (but blocked by disconnect 140) transmit message frame fragments. Since the hot-standby side 120 receives receive frame fragments, it is able to associate its transmit frame fragment sequence numbers to the incoming receive frame fragment sequence numbers. However, the initial sequence of transmit message frame fragment sequence numbers from the hot-standby side 120 will not match the active side 110 sequence of transmit message frame sequence numbers as the startup of hot-standby side 120 may occur at any point in time relative to the ongoing operation of active side 110. Should the hot-standby side be informed of the association between receive frame fragment sequence numbers and transmit frame fragment sequence numbers in use by the active side, then it would be able to adjust its transmit frame fragment sequence number by incrementing it by an appropriate amount.

Figure 2:
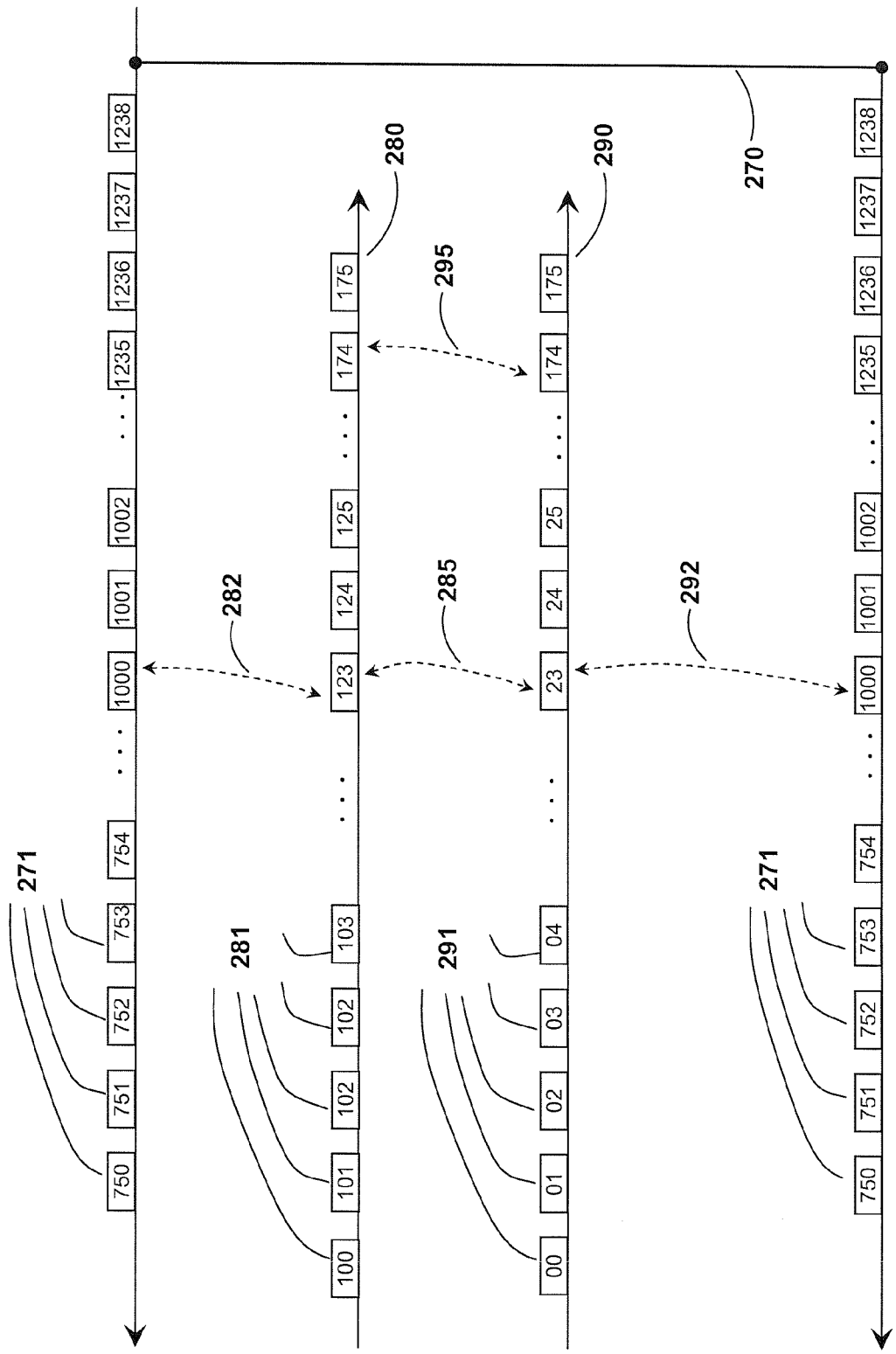
FIG. 2 illustrates timing diagram showing message frame fragment streams with sequence numbers originating and terminating at active and standby sides.

Referring to FIG. 2 there may be seen message frame fragments stream 270 having receive message frame fragments 271 received by the active receiver 112 and standby receiver 122. Also depicted are a transmit message frame fragments stream 280 generated by the active transmitter 116 having transmit message frame fragments 281; and a transmit message frame fragments stream 290 having transmit message frame fragments 291 generated by the standby transmitter 126. Within the respective message streams may be seen message frame fragments bearing sequence numbers.

By way of example, suppose at some point in the past the ActiveTxNum was 123 when it received a receive fragment frame with RxNum of 1000 as indicated by reference 282. Also suppose that on the standby side the StandbyTxNum was 23 when it received the same receive fragment frame with the RxNum of 1000 as indicated by reference 292. Suppose, that after the standby has simulated transmission of 50 fragments (since it received RxNum of 1000), it subsequently learns that the ActiveTxNum was 123 at the time of RxNum 1000 reception. Not knowing the ActiveTxNum, the standby would use a transmit sequence number of 74 (23+50+1) for the next transmit fragment frame sequence number. Instead, having the association used by the active side, the standby calculates the next transmit fragment frame sequence number as follows:

- calculates the delta between ActiveTxNum and StandbyTxNum, e.g. 123−23 is 100 as indicated at reference 285; and
- adds this to the would be transmit fragment frame sequence number of 74, e.g. 100+74 is 174.

Therefore, the next number to be used by the standby would be 174 and not 74. Since the active and the standby transmit the same fragments at the same rate, this operation provides that the active and the transmit fragment frame sequence numbers will be the same, and this will guarantee a seamless switchover in the future. After the delta or offset is applied, the transmit frame fragments sequence numbers will be synchronized as indicated at reference 295.

The method described above assumes that the standby side can learn ActiveTxNum associated with a particular receive frame fragment. One method of learning this association is as follows.

When the standby side starts up and commences receiving fragments, it looks up the sequence number in the fragment received. Based on received number, the standby side extrapolates receive frame fragment sequence numbers that it expects to receive within some next time interval. This time interval can range from seconds to minutes, dependent upon the implementation of the startup procedure and the quantity of switch message traffic present.

Referring back to FIG. 1, the standby side then sends a message via message channel 130 to the active side requesting the active side record its transmit frame fragment sequence numbers when receiving fragments with the specified receive frame fragment numbers. Upon reception of the receive frame fragments having at least one of the specified sequence numbers, the active side records the associated transmit frame fragment sequence number. The active side then forwards the at least one associated number via a message channel 132 to the standby side.

During the same period of time, the standby side records the transmit frame message fragment sequence number it produces at the time that the specified receive frame fragment sequence numbers are received.

On receiving the ActiveTxNum numbers, the standby side calculates the delta or offset in respect to its association and adjusts the StandbyTxNum as per the method described above.

If the active side did not receive the request in time to record the association with the specified sequence numbers, it can inform the standby side that the specified numbers have already transpired. In a preferred mode of operation a plurality of numbers is specified by the standby side so that the active side has an increased likelihood of receiving the request in sufficient time to record the association. This approach avoids having to extrapolate a receive fragment sequence number that is too far in the future to allow a reasonably rapid synchronization of active and standby sides to occur.

If, after some time interval, the standby side has not received an association response from the active side, the extrapolation and request process may be repeated until at least one association is received by the standby side.

Therefore, what has been disclosed is a method and system for MLPPP sequence number synchronization between the active and hot-standby side transmitters in a switch supporting multilink protocols.

Numerous modifications, variations and adaptations may be made to the embodiment of the invention described above without departing from the scope of the invention, which is defined in the claims.

What is claimed is:

1. A method for synchronizing transmit frame fragment sequence numbers of an active transmitter and a standby transmitter on line cards in a switch supporting a multilink protocol having an active side and a standby side, said method comprising;
   - initializing a standby transmit sequence number for the standby transmitter to an initial value;
   - incrementing said standby transmit sequence number with each transmit frame fragment handled by the standby transmitter;
   - associating said standby transmit sequence number with respective receive sequence numbers received by the switch;
   - determining an association of transmit frame fragment sequence numbers used by the active transmitter for respective receive sequence numbers received by the switch, wherein the standby side is informed of an association between the transmit frame fragment sequence numbers and receive frame fragment sequence numbers;
   - calculating an offset to said standby transmit sequence number based upon a difference between said standby transmit sequence number associated to a specific receive sequence number and an active transmit frame fragment sequence number associated to the same specific receive sequence number; and
   - applying said offset to said standby transmit sequence number to bring said standby transmit sequence number in synchronization with transmit sequence numbers of the active side.

2. The method of claim 1, wherein said determining step further comprises:
   - querying the active side by the standby side in respect of the transmit frame fragment sequence numbers associated to receive frame fragment sequence numbers.

3. The method of claim 2, wherein said querying step further comprises:
   - specifying a specific receive frame fragment sequence number.

4. The method of claim 3, comprising:
   - extrapolating the specific receive frame fragment sequence number based at least in part upon the receive frame fragment sequence numbers received by the standby side.

5. The method of claim 2, wherein said querying step further comprises:
   - specifying a plurality of the receive frame fragment sequence numbers.

6. The method of claim 4, wherein said extrapolating step further comprises:
   - collecting receive frame fragment rate information.

7. The method of claim 2, further comprising:
   - repeating said querying step when no association is received by the standby side from the active side.

8. The method of claim 7, further comprising:
   - initiating said repeating step after a specified quantity of time has lapsed.

9. A system for synchronizing transmit frame fragment sequence numbers of an active transmitter and a standby transmitter on line cards in a switch supporting multilink protocol having an active side and a standby side, said system comprising:

a standby transmitter having an initial standby transmit sequence number;

standby transmit frame fragments having incremented standby transmit sequence numbers commencing from said initial standby transmit sequence number;

receive frame fragment sequence numbers received by the switch which are associated with standby transmit sequence fragment sequence numbers;

an association of transmit frame fragment sequence numbers used by the active transmitter for respective receive frame fragment sequence numbers received by the switch;

an offset calculated to said standby transmit sequence number based upon a difference between said standby transmit sequence number associated to a specific receive sequence number and an active transmit frame fragment sequence number associated to the same specific receive sequence number, wherein said offset to said standby transmit sequence number is applied to bring said standby transmit sequence number in synchronization with transmit sequence numbers of the active side, and the standby side is informed of an association between the transmit frame fragment sequence numbers and the receive frame fragment sequence numbers.

10. The system of claim 9, wherein the standby side generates a query to the active side in respect of the transmit frame fragment sequence numbers associated to the receive frame fragment sequence numbers.

11. The system of claim 10, wherein the query specifies a specific receive frame fragment sequence number.

12. The system of claim 11, wherein prior to generating said query there is produced an extrapolation for the specific receive frame fragment sequence number based at least in part upon the receive frame fragment sequence numbers received by the standby side.

13. The system of claim 10, wherein the query specifies a plurality of the receive frame fragment sequence numbers.

14. The system of claim 12, wherein the extrapolation is in part based upon collected receive frame fragment rate information.

15. The system of claim 10, wherein the query is repeated when no association is received by the standby side from the active side.

16. The system of claim 15, wherein said repetition is initiated after a specified quantity of time has lapsed.

17. The method of claim 1, further comprising:
assigning incremental transmit frame fragment sequence numbers to outgoing transmit message frame fragments.

18. The method of claim 1, further comprising:
recording, with the standby transmitter, the transmit frame fragment sequence numbers.

19. The system of claim 9, wherein the active transmitter further comprises:
a first Multi Link Point to Point Protocol (MLPPP) Transmit Module.

20. The system of claim 19, wherein the standby transmitter further comprises:
a second MLPPP Transmit Module.

* * * * *